United States Patent [19]

Pettigrew

[11] Patent Number: 5,800,006
[45] Date of Patent: Sep. 1, 1998

[54] IMPACT PROTECTIVE CAR COVER

[75] Inventor: William Dean Pettigrew, Weatherford, Tex.

[73] Assignee: William D. Pettigrew, Weatherford, Tex.

[21] Appl. No.: 726,216

[22] Filed: Oct. 4, 1996

[51] Int. Cl.⁶ .................................................. B60J 11/00
[52] U.S. Cl. .................................... 296/136; 150/166
[58] Field of Search ........................ 296/136, 95.1; 150/166, 168; 160/370.21

[56] References Cited

U.S. PATENT DOCUMENTS

| | | | |
|---|---|---|---|
| 2,787,311 | 4/1957 | Cohen et al. | 296/136 X |
| 3,665,355 | 5/1972 | Sasaki et al. | 296/136 X |
| 4,807,922 | 2/1989 | Glover | 296/136 |
| 4,925,234 | 5/1990 | Park et al. | 296/136 |
| 5,242,206 | 9/1993 | Heck | 296/136 |
| 5,324,090 | 6/1994 | Lehnhoff | 296/136 X |
| 5,401,074 | 3/1995 | Timerman | 296/136 |
| 5,516,181 | 5/1996 | Thompson | 296/136 X |
| 5,518,289 | 5/1996 | Cobble | 296/136 |
| 5,664,825 | 9/1997 | Henke et al. | 296/136 |

*Primary Examiner*—Joseph D. Pape

[57] ABSTRACT

A protective vehicle cover for the prevention and reduction of damage from hail and similar free falling bodies. A reversible waterproof vinyl on two sides of an impact resistant plastic material covers the top, sides, front, and rear surfaces of a vehicle. The impact resistant material transmits the force of the impact to it's opposing side to reduce the amount of force per unit of area so as to prevent damage as the force is transmitted to the vehicle. Utilization of the impact resistant material permits a product which is light weight, compact, portable, and stores easily in a vehicle trunk compartment.

6 Claims, 4 Drawing Sheets

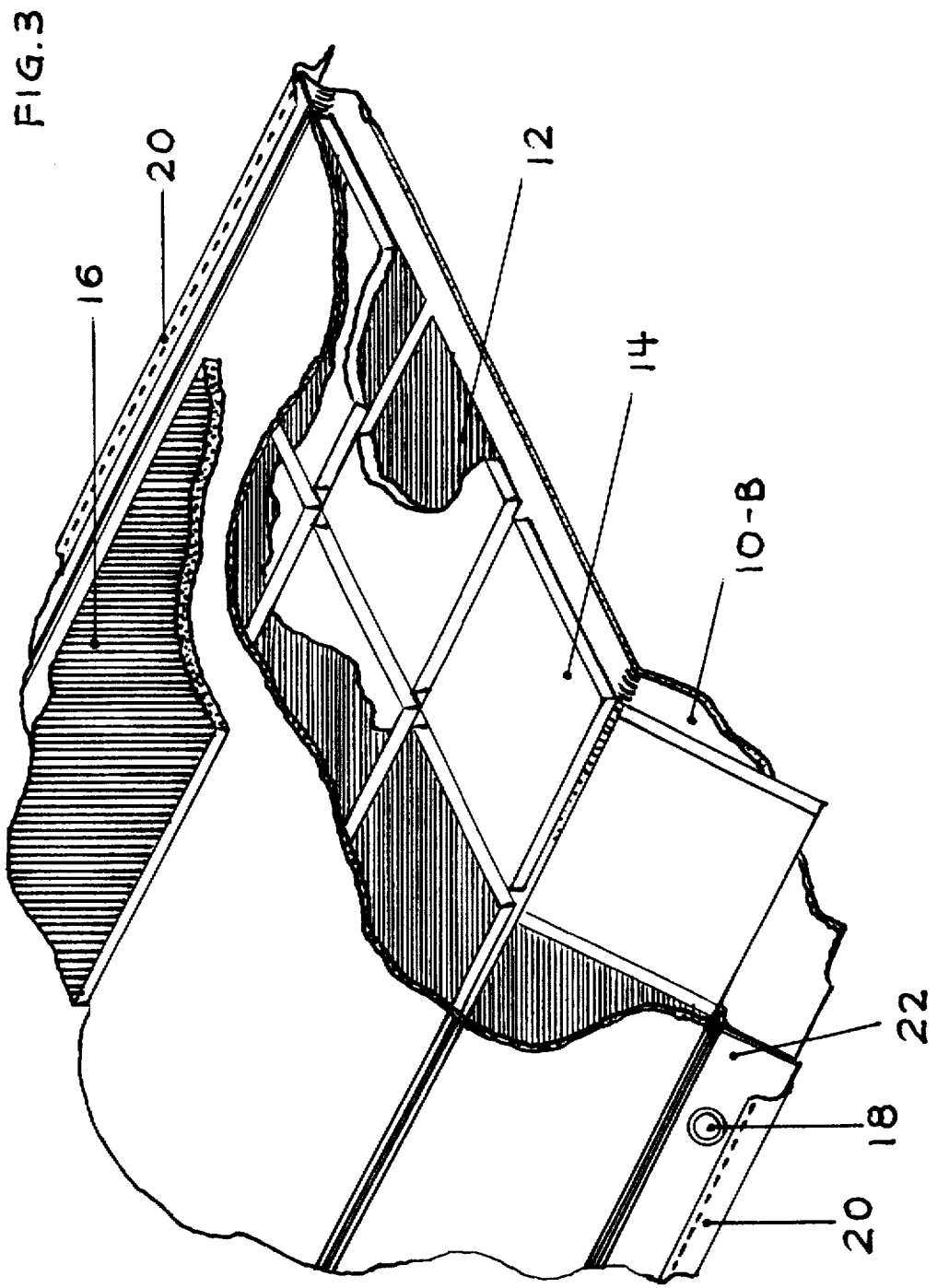

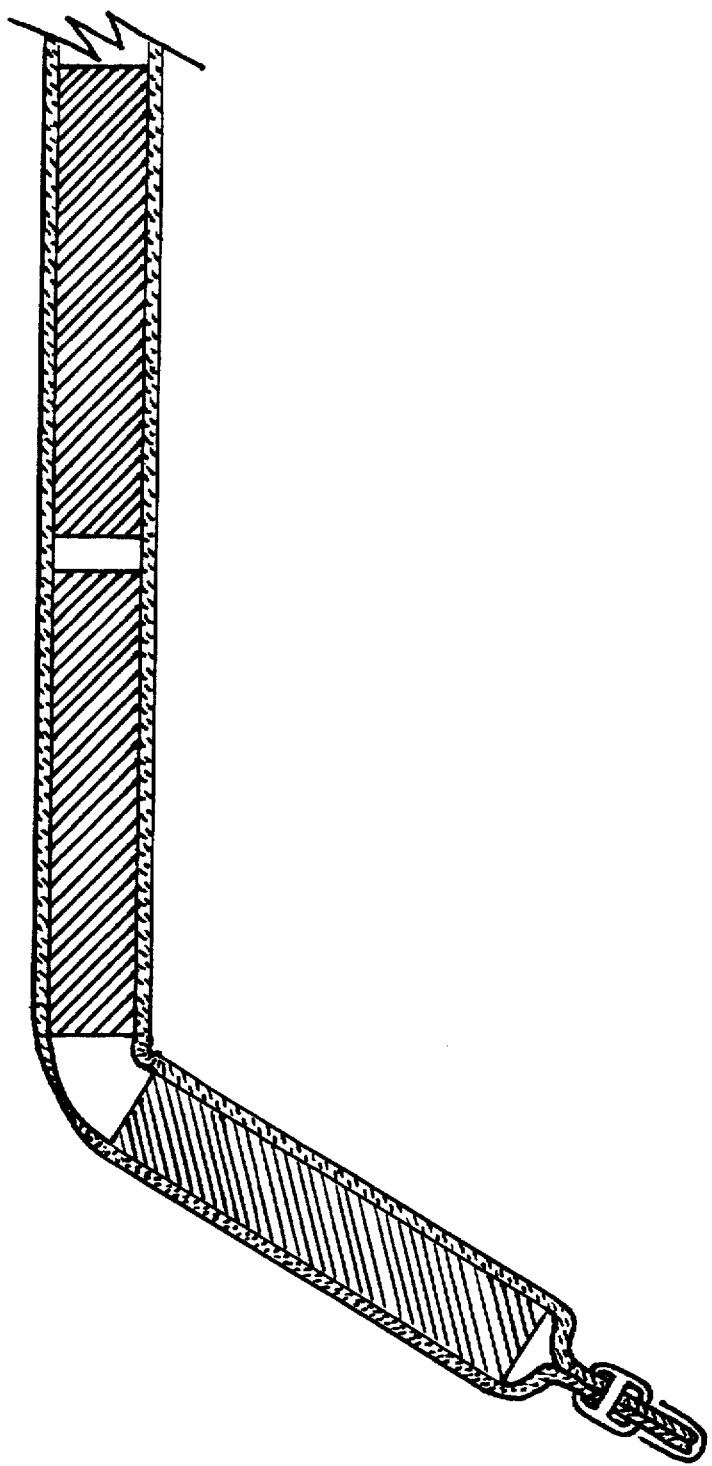

IMPACT PROTECTIVE CAR COVER

BACKGROUND-DESCRIPTION OF RELATED ART

As of to date, I know of no other invention in use that provides a convenient, reliable and effective solution for protecting a vehicle's top, front, rear, sides, and glass areas against hail damage, nor which is functionally reversible, requires no attachment devices, and employs an overlooked third method for preventing and reducing damage to a vehicle, namely what I call the impact or force distributing method. I have developed a protective vehicle cover that addresses most, if not all, of the problems which have been bypassed or overlooked in prior art. Some of the problems include limited protection to the sides of a vehicle, excessive storage requirements, inconvenience in application and removal, lack of adequate protection for larger sized hail, and lack of aesthetics.

Prior art utilizes only one of or a combination of two of three basic methods of hail protection. The first method is what I call the impact barrier method, and the second method I call the impact adsorbing method. Known prior art has failed to use a third method, the force distribution method.

The barrier method of hail protection is simply the use of a cover with an accompanying space or distance between the vehicle surface and the protective cover. The best example is use to date is the garage. The garage appears to be the overall best way to protect a vehicle, but it is also next to impossible to carry to work or on a weekend shopping spree. Hence prior art has tried to emulate a portable garage, but much of the inconvenience of transport and setup have been included along with the portability.

The second method of absorbing the impact of hail and other similar free falling bodies utilizes a material or a combination of materials which lay in contact in most part with the surface of the vehicle being protected. The most widely used example to date appears to be a spouse's king sized bedroom mattress as witnessed after a severe hail storm had engulfed the Dallas and Fort Worth metroplex. This particular method works quite effectively for the vehicle in some respects, but it also has the disadvantages of portability, expense. Hence prior art has tried to emulate this method primarily with the use of bedding-like material and related items. In the related art of old, one may find the near equivalent of a waterbed, portable blow up air mattress, and of course a rolled and tied flexible and spongy foam sheet. However, the matter of a portability and application still seem to present problems. The force distribution method may be better understood by the following:

Should a fairly pointed pencil point be placed perpendicular or there about to the upturned palm of the hand and a substantial mass, such as a large book, be positioned upon the opposite end of the pencil so as to direct the weight of the book through the shaft of the pencil and to the point of the pencil in contact with the palm, a point force will be produced along with a probable yell in an expression of pain. Should the same large book be positioned in the same manner upon one-hundred pencils similar to one another particularly in length and similar as to pointedness to the first pencil, the first unbearable point force has been reduced to a point force on each of the one-hundred pencils equivalent, in essence, to one-hundredth the force per unit of area as to the point force produced by the first pencil point. As the number of pencil points is increased, the point force per pencil point is proportionally decreased until the point force of each pencil point becomes less than distinguishable by the palm of the hand. Note that the pencil shafts are sufficiently rigid enough to transmit the applied force from the book to the palm of the hand. Now envision a hail stone which essentially has a point force of impact striking a sufficiently rigid object laying parallel and perpendicular respectively to a thin metal surface and to the direction of impact of the hail stone. The concentrated point force of the hail stone is transmitted through the intervening object and distributed to the thin metal surface from hundreds of points of reduced force. The once damaging point force of the hail stone now covers an area very large with respect to the area of the point of impact and is prevented from causing damage to the thin metal surface. It should be sufficiently understood by now as to how one may prevent damage from impacting hail by the force distribution method as well as to how one may lay upon a bed of nails and arise unscathed.

Prior art is quite limited in the specific area of impact protection from damaging hail and similar free falling bodies. Several of the inventors seemed to include hail impact protection as a possible additional benefit to a protective cover for use primarily against moisture and/or dust. Others have specifically sought to address the area of hail protection and have advanced the knowledge in this area, but seem to have fallen short of producing art meeting the market requirements of the common consumer.

U.S. Pat. No. 4,807,922 to Glover, (1989), used the absorbing method of impact protection. A foam-like padding was utilized in this protective cover. Glover suggests in his abstract that the protective impact cover may require replacement sections, hence the protective impact cover has zippers. Zippers are very effective devices, but, on a vehicle cover requiring extensive lengths of zipping, could cause significant delays during a hurries attempt of deployment. Zippers could possibly cause the consumer an additional disadvantage should they scratch or mar the body paint of the vehicle. The protective covering was also envisioned as being used on a vehicle during emergency runs. However, one has to wonder how to get into and out of the vehicle when the protective cover is deployed. Though the protective cover obviously utilized effective materials, the range of thickness specifications for the foam-like material appears to be inadequate for a common Texas panhandle hail storm, and begins to look more like a dust and moisture protective cover for which the Texas panhandle residents could most likely use quite often for the dust but seldom for the moisture.

U.S. Pat. No. 4,925,234 to Park, 1988, is apparently a protection device designed to protect against problems such as bugs, leaves, dust, etc. Park's invention is unique in its own right, but shows no obvious concern for impact protection.

U.S. Pat. No. 5,462,329 to Cheng, 1995, appears to be primarily a weather protective cover for a vehicle. It further appears that his priorities are more with the mechanical device for rolling up a sheet of covering rather than with the protection of a vehicle during a hail storm. This particular barrier type method apparatus may be effective for the prevention of hail damage to top portions of a vehicle, but it also appears to be a formidable task during application unless one is prepared to sacrifice the inherent beauty of one's personal vehicle for a permanent vehicular adornment.

U.S. Pat. No. 5,516,181 to Thompson, 1996, a ROLL-UP ENVIRONMENTAL ELEMENTS PROTECTOR FOR A MOTOR VEHICLE that utilizes, in part, the impact barrier method for preventing hail damage. Thompson states unequivocally that an air space must be used in order to protect against frozen precipitation, such as hail, and lauds the fact that his provided air space will prevent mildew and provide insulation. Although this invention provides an air space, there is essentially no hail protection at all where the cover forms a tangency and rests upon the vehicle roof surface leading to the front and rear window areas and from the tangency points formed at the front of the vehicles hood area and at the rear of the vehicles trunk area. Therefore as the frozen precipitation exceeds sleet proportions, the likelihood of hail damage increases in spite of the air space formed by the protective cover.

U.S. Pat. No. 2,787,311 to Cohen et al., 1957, primarily uses the barrier method in a fluid filled top portion of his invention for the purpose of keeping the vehicle cool during the heat of the day. The portable waterbed-like portion appears to be a tremendous time-consuming event provided that the user can find an adequate and convenient source of the proper fluid to deploy the invention, and provided that at the end of a long work day the user is willing to spend the necessary time to empty the fluid and store the invention. Although the cooling effect may have been desirable in the 1950's, later automotive cooling systems have tremendously improved with respect to efficiency and cost and have essentially eliminated the need for Cohen's invention. Cohen also utilized a separate section for protecting the windshield of the vehicle, which is constructed of a light, flexible material with many areas of fold and with an elastic type material to provide a stretching means for an implied one-sized-fits-all windshield section. The windshield section employs a piece of plastic, fiber board, or cardboard with the sole purpose of insulation for preventing frost from forming on the protected windshield. Although there appears to be striking similarities in Cohen's windshield portion and may invention, nowhere does Cohen even mention nor indicate any anticipation what-so-ever of a rigid member sufficient for impact or force distribution but rather stresses the flexibility inherent in this portion of his invention. Cohen essentially indicates that his invention is primarily for keeping a vehicle cool in hot weather and the windshield frost free in cold weather, and although it would likely perform well in preventing or reducing impact damage from hail to the vehicle body, the windshield portion provides essentially no form of impact damage protection.

U.S. Pat. No. 3,665,355 to Sasaki et al., 1972, from the ABSTRACT is specifically for protecting coatings of automobiles and the like, and from the BACKGROUND OF THE INVENTION is particularly for use during the assembly process of the vehicle. Although the cover may utilize some materials which normally might be useful in absorbing methods of protection, and although the cover may prevent damage to the paint surface of the vehicle under assembly from a dropped jig and the like, the cover appears to be far away from having any capability of preventing damage from impacting hail or the like.

U.S. Pat. No. 5,242,206 to Heck, 1993, is an AUTOMOTIVE HAIL BLANKET which utilizes the barrier method of impact protection and one of the vehicle's inflated tires to form air pockets. The AUTOMOTIVE HAIL BLANKET appears to be quite effective except for the side areas and the accompanying glass of the automobile being protected. The compactness of the cover is related in the patent drawings, but if one recalls the first experience with a blow up air mattress, one may recall the next to impossible task of putting the air mattress back into the original package. The ease of deployment might tend to cause a less than adequate use of the preferable body straps should application take place under a hurried time frame thus providing an opportunity for a stiff breeze to displace the blanket and expose the once underlying areas to damaging hail.

U.S. Pat. No. 5,324,090 to Lehnoff, 1994, is a windshield cover that appears to be approaching the third method of force distribution. In fact this invention is only a refinement of the barrier method and the adsorption method in combination as the design and materials respectively provide a barrier utilizing air space and a somewhat flexible yet fairly rigid plastic material for a force acting perpendicular to the plane of the panel for the second absorption method. It is stated under the OBJECTS OF THE INVENTION that the windshield cover will provide mechanical protection against snow and ice, but nowhere does one find any mention of hail protection for the windshield and certainly none for the remainder of the vehicle.

U.S. Pat. No. 5,401,074 to Timerman, 1995, uses a combination of the barrier and absorption methods with a unique twist. The uniqueness is in a trampoline effect produced by the fully deployed protective cover whereupon impacting hail bounces off. A tremendous leap forward for automotive hail damage prevention with regards to weight reduction, the protective cover fails to provided side protection to a vehicle and may fail to function properly should the required tension straps be misapplied or not applied. In the protective cover, a netting is utilized as the trampoline, and foam runners are utilized for the bounce effect. However moisture, which may accompany hail, might be absorbed by the foam runners acting as a sponge and significantly reduce the amount of bounce and lead to failure in the performance of the protective cover. Some hail stones which make the perfect fit into a netting opening and become lodged therein could conceivably cause a failure in the performance of the protective cover.

The unaddressed problems related to the prior art have been addressed through the unobvious utilization of the force distribution method of impact protection in my invention. The advantages of reliable effectiveness, of reversibility of the protective hail impact cover, of the ease of application and of removal, of the lightness in weight, of the overall increase of area protected in the surface area of a vehicle, of the simplicity, of the pleasing appearance in aesthetics, and of the portability will become apparent in the SUMMARY OF THE INVENTION yet to follow.

SUMMARY OF THE INVENTION

The invention establishes the use of a third method of preventing and reducing damage from impacting free falling bodies such as hail. The first method is a barrier which prevents an impacting body from reaching the protected component and utilizes a space between the barrier and the object being protected. This invention uses the barrier method in part. The second method is an impact or force absorption material or device which bears the brunt of the impact and deforms thus absorbing the energy of the impact. The absorption method rests directly on the object being protected in most cases, and this invention combines this method with the first method to provide a double measure of protection to the front and rear windows when time allows full deployment. The third method is force distribution of the impact. The third method is the primary method utilized in this invention. This invention therefore uses three methods of preventing impact damage as opposed to only one or two.

The invention, a "HAIL-JACKET", is primarily a protective hail cover which extends essentially from the front to the back and along the sides of a vehicle protecting the most vulnerable portions from impacting hail, namely the top, front, rear, and side portions of a vehicle. The essential components are a force distributing member bearing the brunt of an impact, and a confining member for restraining the movement of the force distributing material. The force distributing member transmits the force of impact therein to an opposing surface essentially laying in contact with and parallel to the protected vehicle surface, whereupon the transmitted force is imparted to the vehicle surface from the portion of the force distributing member in contact with the surface such that the force per unit of area of the initial impact is substantially reduced to a much smaller force per unit of area. The force distributing member essentially takes advantage of the vehicle's surface material properties of plasticity and elasticity though these properties may be relatively small.

The essential components of the sections comprise: a force distributing member and a confining member.

Between the layers of the confining member is the heart and soul of the invention, the force distributing material. Although most any riged-like material capable of withstanding the impact for which the invention was designed could be utilized with some degree of success, the more desirable materials are those being polymeric in nature such as polycarbonate plastics with relatively rigid and tough properties.

The sections will behave in an essentially flexible manner and generally conform to the parallel-like surfaces of a vehicle. The amount of flexible-like behavior is dependent upon the properties of the confining member, the amount of space provided between adjacent members, the size of the members, the shape of the members, and other factors to a lesser extent. The main factor is the spacing between adjacent members. Should the spacing be too little, the flexibility may be reduced too much; but if the spacing is too great, the invention might lose a significant portion of efficiency. The primary factor governing the spacing is the thickness of the members, such that a greater thickness requires a greater spacing arrangement between adjacent members. Numerous factors have to be taken into account when determining the design of the force distributing members. The members perform best if a slight elastic deformation is produced by a member upon impact, and again the thickness of the member plays a significant part. The overall shape of the members other than thickness has a significant part in the effectiveness of the invention. The more uniform the shape is, then the more reliable the entire plurality of the force distributing members is. Aside from design, the most significant factor appears to be product availability and cost. The above factors as well as others have led to the preferred embodiment being comprised of simple rectangular units for the force distributing members.

BRIEF DESCRIPTION OF THE DRAWINGS

FIG. 3 shows a section of the new invention and the placement of all preferred embodiments used in this impact car cover.

FIG. 4 is an end view drawing of FIG. 3 showing the flexibility of the preferred embodiments in the invention.

Figure 1:
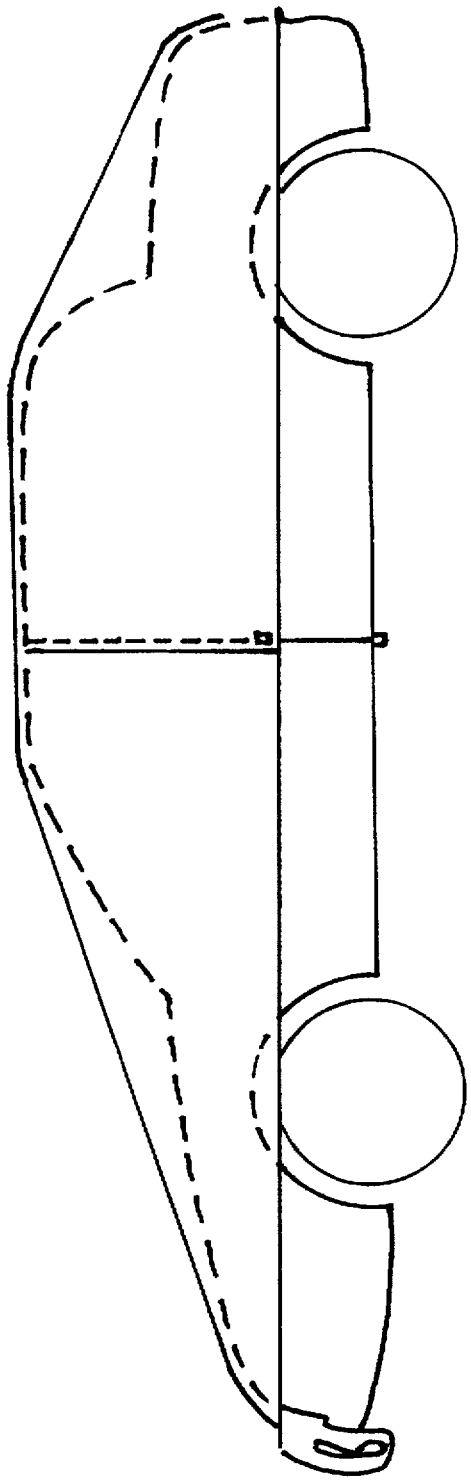
FIG. 1 shows the areas of coverage provided by the new invention on a compact size automobile.

A list of reference numerals will enable a better understanding of the placements of the preferred embodiments of the invention as follows:

10. top vinyl-like layer
10-B. bottom vinyl-like layer
12. engaging area
14. impact resistant plastic force distributing unit
16. loop and book coupling material (VELCRO)
18. grommet
20. border trim
22. perimeter boundary (edge)

DETAILED DESCRIPTION OF THE PREFERRED EMBODIMENTS

Figure 2:
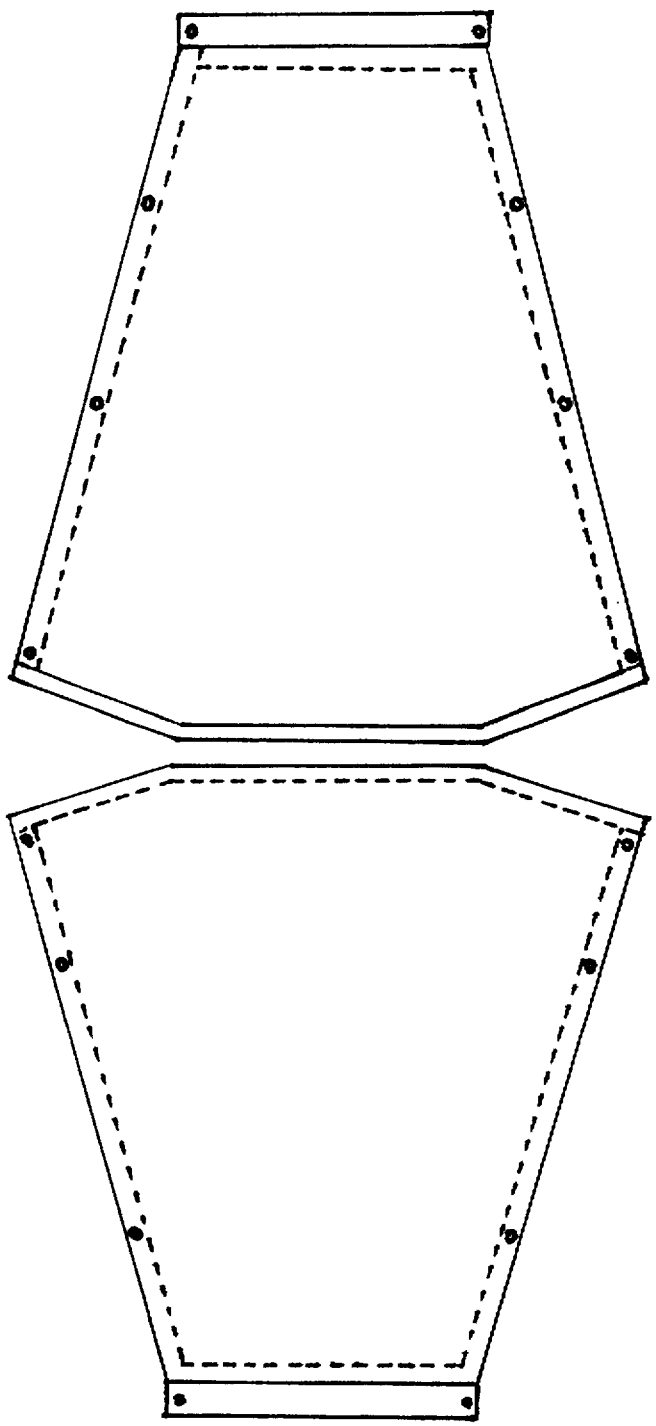
FIG. 2 shows and gives a general idea of the shape the invention will have as seen in FIG. 1.

With reference to the drawings, in FIG. 3 the "Hail Jacket" is shown including a bottom vinyl-like layer 10-B of a flexible polymeric material which has memory and is the layer of the invention which is essentially resting upon the vehicle surface. A plurality of rectangular impact resistant plastic plates 14 constructed of a polycarbonate plastic material are then aligned and arranged relative to the bottom layer 10-B in a spaced checkerboard-like fashion and attached to the bottom layer 10-B at engaging areas 12. A top vinyl-like layer 10 of similar size and material to the bottom layer 10-B is then attached to the top surface of the plates 14. The top and bottom layers make up a confining member which "confines" the plurality of plastic plates therein. A length of hook and loop fastener material 16 is also attached to an edge of the top layer 10 for joining two complimentary sections of the Hail Jacket for complete vehicle surface protective coverage as shown in FIG. 2. A border trim 20 is also stitched to the perimeter edge 22 of the Hail Jacket and grommets 18 are provided on the edge 22 of the hail Jacket adjacent to the border trim 20. The grommets are for affixing the Hail Jacket to a vehicle with the use of tension straps attached to the undercarriage of the vehicle.

The preferred embodiment of the invention comprises a plurality of sections see FIGS. 1 and 2, for added convenience in deployment and removal, extending over the upper most surfaces of the vehicle from the upper most parts of the front vehicle bumper as a reference and to the uppermost parts of the back vehicle bumper as a reference, and extends downward from the outer perimeters of the upper most vehicle surfaces and over the exterior side surfaces the length of the vehicle and over the window areas and downward past the door handle area for vehicles having inwardly directed exterior surfaces below the door handle region, where the side regions of the invention may extend near to or past the base of the vehicle sides should the exterior portions of the vehicle's sides be directed essentially outward or perpendicular to the path of travel below the door handle regions.

The conforming member will for the most part form a space between it and the vehicle where vehicle surfaces, such as a windshield, form relatively oblique surfaces to the general flow of the body design, however the design will continue to provide protection should the space be removed for whatever reason, and this forms the basis of the inventions' reversibility in that either planar side of the invention produces essentially the same quality of protection.

The force distributing member of the invention and/or its units in essence may utilize a multitude of materials possessing qualities of stiffness and/or rigidity. Therefore, the materials utilized in the preferred mode or embodiment as disclosed in this document exemplify a preference and should not be construed as eliminating other suitable or like materials. The preferred shape of the force distributing unit as being rectangular was determined in part due to availability of premanufactured materials and concern for the economic impact on a potential consumer and should not be considered as the only shape or pattern desirable as it has been anticipated that certain circumstances may arise which will permit a variation of the shape or pattern to a certain degree of variance. The preferred size of the force distributing unit as presented in this document is preferential as pertaining to a compact size vehicle having numerous curvatures of body surface and one should realize that other configurations of surfaces under protection may tend to require an increase or a decrease in size of the unit.

It is the object of the invention to provide an unobvious method of protection against damage from impacts, such as hail, to provide a protective impact cover which is easily applied and removed by one person, to provide a working product right out of the storage container, to provide the desirability of a water proof protective cover, to provide a reversible protective cover for faster use, to provide a protective cover which readily conforms to various round and rectangular shapes, to provide a protective cover which is durable, to provide a product with a long life span for repeated usage, and to provide a protective cover which fits conveniently in a trunk for easy portability.

While the above description of the new invention contains many specificities, these should not be construed as limitations of the scope of the present invention, but rather as an exemplification of one preferred embodiment thereof. Accordingly, the scope of the present invention should be determined not by the embodiments illustrated, but by the appended claims and their legal equivalents.

I claim:

1. A large and relatively flexible cover that is adapted to be manually placed and is of a size to extend over at least most of an upper surface and lateral side surfaces of a vehicle for protecting the upper and lateral surfaces of the vehicle from impact forces associated with falling hail, consisting of:

at least two complimentary sections that are releasably attachable to one another to fully cover the vehicle, each section including:

a bottom vinyl like, flexible plastic layer having memory and adapted to contact the vehicle surfaces;

a plurality of rigid impact resistant plastic plates attached on top of the bottom layer in a spaced apart checkerboard like manner, each of the plates have an upper surface and a lower surface; and a top vinyl like, flexible plastic layer, having memory and constructed of substantially the same size and shape as the bottom layer, attached to the upper surfaces of said plurality of plates, whereby upon impact on said top layer of said cover by hail the impact force associated with the hail is transferred through said top layer into one or more of said plurality of plates which distributes the impact force of the hail from the impact point on the upper surface of the plate to a large area on the lower surface of the plate and then to said bottom layer in order to prevent damage to the vehicle.

2. The cover as set forth in claim 1 wherein said top and bottom layers are constructed of a polymeric material.

3. The cover as set forth in claim 1 wherein said plurality of plates are constructed of a polycarbonate plastic material.

4. The cover as set forth in claim 1 wherein said two complimentary sections are releasably attachable by hook and loop fasteners.

5. The cover as set forth in claim 1 wherein a border trim is stitched to at least a portion of the perimeter of the cover.

6. The cover as set forth in claim 1 wherein a plurality of grommets are provided along the outside edges of the two complimentary sections adapted for affixing the cover to the vehicle with tension straps.

* * * * *